(12) United States Patent
Sako et al.

(10) Patent No.: US 9,479,707 B2
(45) Date of Patent: Oct. 25, 2016

(54) IMAGE CAPTURING METHOD

(71) Applicant: ACUTELOGIC CORPORATION, Shinagawa-ku, Tokyo (JP)

(72) Inventors: Yasushi Sako, Tokyo (JP); Tsutomu Okuno, Tokyo (JP)

(73) Assignee: ACUTELOGIC CORPORATION, Tokyo (JP)

( * ) Notice: Subject to any disclaimer, the term of this patent is extended or adjusted under 35 U.S.C. 154(b) by 0 days.

(21) Appl. No.: 14/980,091

(22) Filed: Dec. 28, 2015

(65) Prior Publication Data

US 2016/0191881 A1    Jun. 30, 2016

(30) Foreign Application Priority Data

Dec. 25, 2014    (JP) ................................ 2014-262085

(51) Int. Cl.
*H04N 5/235* (2006.01)
*H04N 9/73* (2006.01)
*H04N 5/225* (2006.01)

(52) U.S. Cl.
CPC .......... *H04N 5/2354* (2013.01); *H04N 5/2352* (2013.01); *H04N 9/735* (2013.01); *H04N 5/2256* (2013.01)

(58) Field of Classification Search
CPC .. H04N 5/2256; H04N 5/235; H04N 5/2351; H04N 5/2352; H04N 5/2354; H04N 9/73; H04N 9/735
See application file for complete search history.

(56) References Cited

U.S. PATENT DOCUMENTS

| 2003/0142496 | A1 | 7/2003 | Bloom et al. |
| 2007/0257992 | A1 | 11/2007 | Kato |
| 2010/0254692 | A1 | 10/2010 | Kurt et al. |
| 2013/0176482 | A1* | 7/2013 | Hirasawa ............ G03B 7/16 348/370 |
| 2015/0304620 | A1* | 10/2015 | Guyomarc'h ........ H04N 9/735 348/224.1 |
| 2016/0088278 | A1* | 3/2016 | Velarde .............. H04N 9/735 348/371 |

FOREIGN PATENT DOCUMENTS

| JP | H06-214292 | A | 8/1994 |
| JP | 2002-369211 | A | 12/2002 |
| JP | 2003-244483 | A | 8/2003 |
| JP | 2010-219606 | A | 9/2010 |
| JP | 2011-507023 | A | 3/2011 |
| JP | 5007523 | B2 | 6/2012 |
| JP | 2012-141445 | A | 7/2012 |
| JP | 5311963 | B2 | 7/2013 |

OTHER PUBLICATIONS

Japanese office action issued on Jul. 7, 2015 in the counterpart Japanese office action.

* cited by examiner

*Primary Examiner* — Daniel M Pasiewicz
(74) *Attorney, Agent, or Firm* — Mots Law, PLLC

(57) ABSTRACT

A first line passing through a coordinate point which represents the light-source color of ambient light is drawn so as to cross a line segment connecting two coordinate points which points respectively represent colors of light emitted from the two light-emitting sources. An image of a subject is captured while light is emitted from the two light-emitting sources toward the subject in such a manner that the volumes of light emitted from the two light-emitting sources respectively correspond to those represented by a predetermined point which is, or close to, the intersection point of the first line and the line segment on the basis of the intersection point and light volume information. A White Balance adjustment correction value is obtained on the basis of light volume information with respect to the two light-emitting sources, the predetermined point, and the point representing the light-source color.

5 Claims, 7 Drawing Sheets

IMAGE CAPTURING METHOD

BACKGROUND OF THE INVENTION

The present invention relates to an image capturing method. In particular, the present invention relates to an image capturing method including White Balance adjustment on a captured image.

The color of flash light (light from a flash) is usually different from the color of ambient light. Thus, when performing White Balance adjustment, the following question may arise: on the basis of which area in a captured image White Balance adjustment should be made. For example, between a subject closer to a device and a subject farther from the device, there is a difference in the ratio of flash light to ambient light applied to the subject. Because of this, depending on which of subject areas in the captured image is used for the White Balance adjustment, the result of the White Balance adjustment differs. Thus, the question is, on the basis of which subject area White Balance adjustment should be performed arises.

One of possible ways to deal with the above situation is to control the color of flash light so as to be as close as possible to the color of ambient light. This is because, if the color of flash light matches the color of ambient light, the result of White Balance adjustment does not differ depending on the subject area on the basis of which White Balance adjustment is performed. There have been approaches to make the color of flash light close to the color of ambient light, by using a plurality of light-emitting sources instead of a single light-emitting source to emit flash light. With this, the mixed color of combined light emitted from the light-emitting sources gets closer to the color of ambient light than in the case where light is emitted from such a single light-emitting source. In Japanese Patent No. 5311963 (Patent Literature 1), two light-emitting sources are used to control the color of combined flash light so as to be close to the color of ambient light. In Japanese Unexamined Patent Publication No. 2012-141445 (Patent Literature 2) and Japanese Patent No. 5007523 (Patent Literature 3), three light-emitting sources are used to control the color of combined flash light so as to be close to the color of ambient light.

SUMMARY OF THE INVENTION

Now, let us consider the case where a plurality of light-emitting sources are used to control the color of combined flash light so as to be close to the color of ambient light. In this case, the more variety of colors of light are emitted from the light-emitting sources, the broader the range within which combined flash light is adjustable is. In such a broader range, the flash light is adjustable to a variety of ambient light. In this aspect, more various types of ambient light can be dealt with when three light-emitting sources are used as is described in Patent Literatures 2 and 3 than the case where two light-emitting sources are used as is described in Patent Literature 1. This is because the range adjustable with the use of three light-emitting sources extends in two dimensions while the range adjustable with the use of two light-emitting sources extends in one dimension.

However, if the number of the light-emitting sources is increased from two to three, it becomes difficult to slightly control the light-emitting sources when making the mixed color of combined flash light so as to be close to the color of ambient light, because the number of the light-emitting sources to be adjusted is increased from two to three. Further, when adjustment is performed to reduce the effect of the individual difference of each light-emitting source, for example, adjustment of three light-emitting sources is more difficult than that of two light-emitting sources.

When two light-emitting sources are used, however, it is not easier to control the color of flash light so as to match the color of ambient light than in the case where three light-emitting sources are used, as described above. This may lead to difficulty in suitable adjustment of White Balance.

An object of the present invention is to provide an image capturing method which ensures easiness in control and adjustment of light-emitting sources, and facilitates suitable White Balance adjustment.

According to an aspect of the present invention, provided is an image capturing method of capturing an image of a subject while emitting light from two light-emitting sources toward the subject, the light-emitting sources being configured so that color temperatures of light emitted from the respective light-emitting sources are different from each other and a ratio between the volumes of light emitted from the light-emitting sources is variably controllable. The method includes: a light-source color obtaining step of obtaining a light-source color of ambient light; a preliminary image capturing step including a no-light-emission image capturing step of capturing an image of the subject without light emission from the two light-emitting sources, and a light-emission image capturing step of capturing an image of the subject with light emitted from the two light-emitting sources; a light-emitting source light volume obtaining step of obtaining light volume information indicating a relationship between the light volume related to ambient light and the total volume of light from the two light-emitting sources, on the basis of the images of the subject captured in the preliminary image capturing step; an image capturing step of capturing an image of the subject while emitting light from the two light-emitting sources toward the subject in such a manner that the volumes of light emitted from the two light-emitting sources respectively correspond to those represented by a predetermined point which is (i) an intersection point of a first line and a line segment or (ii) a point close to the intersection point in xy chromaticity coordinates, on the basis of the intersection point and the light volume information obtained in the light-emitting source light volume obtaining step, the first line passing through a first coordinate point in the xy chromaticity coordinates which represents the light-source color obtained in the light-source color obtaining step, the first line being drawn so as to cross the line segment at a predetermined angle, the line segment connecting two coordinate points in the xy chromaticity coordinates which points respectively represent colors of light emitted from the respective two light-emitting sources; and a White Balance adjustment step of performing White Balance adjustment on the image captured in the image capturing step on a basis of a White Balance adjustment correction value obtained with reference to a second coordinate point which is on a second line and corresponds to the light volume information obtained in the light-emitting source light volume obtaining step, the second line passing through the predetermined point and the first coordinate point in the xy chromaticity coordinates which represents to the light-source color. Assuming that: a color component ratio of R, G, and B signals which are obtained from the image captured in the no-light-emission image capturing step and normalized with respect to G signal is $P0\_r$, $P0\_g$, $P0\_b$; a color component ratio of a difference between (i) R, G, and B signals obtained from the image captured in the light-emission image capturing step and (ii)

R, G, and B signals obtained from the image captured in the no-light-emission image capturing step, values of which differences are normalized with respect to G signal, is $P1\_r$, $P1\_g$, $P1\_b$; and a color component ratio of R, G, and B components of a mixed color of combined light emitted from the two light-emitting sources normalized with respect to G component is $P2\_r$, $P2\_g$, $P2\_b$, a color component ratio $Pe\_r$, $Pe\_g$, $Pe\_b$ of R, G, and B components of the light-source color of ambient light normalized with respect to G component is calculated on the basis of below-described Equation 1. (Equation 1) $Pe\_i = P0\_i * P2\_i / P1\_i$ (where i designates each of r, g and b: i=r, i=g, and i=b)

According to another aspect of the present invention, provided is an image capturing method of capturing an image of a subject while emitting light from two light-emitting sources toward the subject, the light-emitting sources being configured so that color temperatures of light emitted from the respective light-emitting sources are different from each other and a ratio between the volumes of light emitted from the light-emitting sources is variably controllable. The method includes: a light-source color obtaining step of obtaining a light-source color of ambient light; a preliminary image capturing step including a no-light-emission image capturing step of capturing an image of the subject without light emission from the two light-emitting sources, and a light-emission image capturing step of capturing an image of the subject with light emitted from the two light-emitting sources; a light-emitting source light volume obtaining step of obtaining light volume information indicating a relationship between the light volume related to ambient light and the total volume of light from the two light-emitting sources, on the basis of the images of the subject captured in the preliminary image capturing step; an image capturing step of capturing an image of the subject while emitting light from the two light-emitting sources toward the subject in such a manner that the volumes of light emitted from the two light-emitting sources respectively correspond to those represented by a predetermined point which is (i) an intersection point of a first line and a line segment or (ii) a point close to the intersection point in xy chromaticity coordinates, on the basis of the intersection point and the light volume information obtained in the light-emitting source light volume obtaining step, the first line passing through a first coordinate point in the xy chromaticity coordinates which represents the light-source color obtained in the light-source color obtaining step, the first line being drawn so as to orthogonally cross the line segment, the line segment connecting two coordinate points in the xy chromaticity coordinates which points respectively represent colors of light emitted from the respective two light-emitting sources; and a White Balance adjustment step of performing White Balance adjustment on the image captured in the image capturing step on a basis of a White Balance adjustment correction value obtained with reference to a second coordinate point which is on a second line and corresponds to the light volume information obtained in the light-emitting source light volume obtaining step, the second line passing through the predetermined point and the first coordinate point in the xy chromaticity coordinates which represents to the light-source color.

According to still another aspect of the present invention, provided is an image capturing method of capturing an image of a subject while emitting light from two light-emitting sources toward the subject, the light-emitting sources being configured so that color temperatures of light emitted from the respective light-emitting sources are different from each other and a ratio between the volumes of light emitted from the light-emitting sources is variably controllable. The method includes: a correcting step of correcting target values on the basis of at least two measured values related to the two light-emitting sources, the target values representing color information related to mixed color of light from the two light-emitting sources and being different from the measured value, the number of the target values being larger than the number of the measured values; a light-source color obtaining step of obtaining a light-source color of ambient light; a preliminary image capturing step including a no-light-emission image capturing step of capturing an image of the subject without light emission from the two light-emitting sources, and a light-emission image capturing step of capturing an image of the subject with light emitted from the two light-emitting sources; a light-emitting source light volume obtaining step of obtaining light volume information indicating a relationship between the light volume related to ambient light and the total volume of light from the two light-emitting sources, on the basis of the images of the subject captured in the preliminary image capturing step; an image capturing step of capturing an image of the subject while emitting light from the two light-emitting sources toward the subject in such a manner that the volumes of light emitted from the two light-emitting sources respectively correspond to those represented by a predetermined point which is (i) an intersection point of a first line and a line segment or (ii) a point close to the intersection point in xy chromaticity coordinates, on the basis of (a) the intersection point, (b) the light volume information obtained in the light-emitting source light volume obtaining step, and (c) corrected values of the target values representing color information, which are corrected in the correcting step, the first line passing through a first coordinate point in the xy chromaticity coordinates which represents the light-source color obtained in the light-source color obtaining step, the first line being drawn so as to cross the line segment at a predetermined angle, the line segment connecting two coordinate points in the xy chromaticity coordinates which points respectively represent colors of light emitted from the respective two light-emitting sources; and a White Balance adjustment step of performing White Balance adjustment on the image captured in the image capturing step on a basis of a White Balance adjustment correction value obtained with reference to a second coordinate point which is on a second line and corresponds to the light volume information obtained in the light-emitting source light volume obtaining step, the second line passing through the predetermined point and the first coordinate point in the xy chromaticity coordinates which represents to the light-source color.

In the above aspect of the present invention, it is preferable that the correcting step includes a coordinate value correcting step of correcting coordinate values on the line segment in accordance with the two measured values on the basis of information stored in a storage unit in which the two measured values and the plurality of coordinate values are stored.

According to still another aspect of the present invention, provided is an image capturing method of capturing an image of a subject while emitting light from two light-emitting diodes toward the subject, the light-emitting diodes being configured so that color temperatures of light emitted from the respective light-emitting diodes are different from each other and a ratio between the volumes of light emitted from the light-emitting diodes is variably controllable. The method includes: a light-source color obtaining step of obtaining a light-source color of ambient light; a preliminary image capturing step including a no-light-emission image capturing step of capturing an image of the subject without light emission from the two light-emitting diodes, and a light-emission image capturing step of capturing an image of the subject with light emitted from the two light-emitting diodes; a light-emitting source light volume obtaining step of obtaining light volume information indicating a relationship between the light volume related to ambient light and the total volume of light from the two light-emitting diodes, on the basis of the images of the subject captured in the preliminary image capturing step; an image capturing step of capturing an image of the subject while emitting light from the two light-emitting diodes toward the subject in such a manner that the volumes of light emitted from the two light-emitting diodes respectively correspond to those represented by a predetermined point which is (i) an intersection point of a first line and a line segment or (ii) a point close to the intersection point in xy chromaticity coordinates, on the basis of the intersection point and the light volume information obtained in the light-emitting source light volume obtaining step, the first line passing through a first coordinate point in the xy chromaticity coordinates which represents the light-source color obtained in the light-source color obtaining step, the first line being drawn so as to cross the line segment at a predetermined angle, the line segment connecting two coordinate points in the xy chromaticity coordinates which points respectively represent colors of light emitted from the respective two light-emitting diodes; and a White Balance adjustment step of performing White Balance adjustment on the image captured in the image capturing step on a basis of a White Balance adjustment correction value obtained with reference to a second coordinate point which is on a second line and corresponds to the light volume information obtained in the light-emitting source light volume obtaining step, the second line passing through the predetermined point and the first coordinate point in the xy chromaticity coordinates which represents to the light-source color. The light-emitting source light volume obtaining step includes: a step of obtaining distance information D (m, n) in image signals obtained from the image captured in the preliminary image capturing step, on the basis of the image signals and in accordance with the below-described Equation 2; a step of obtaining an area corresponding to a main subject from the captured image on the basis of the distance information D (m, n); and a step of obtaining the light volume information with respect to the area corresponding to the main subject. (Equation 2) D (m, n)=(LV0–LOG$_2$ (Y1 (m, n)/Y0 (m, n)−1))/2

In Equation 2, (m, n) represents location in horizontal and vertical directions in the captured image; LV0 represents the total volume of flash light from the two light-emitting diodes in APEX value; Y0 (m, n) represents the brightness value at the location (m, n) obtained from the image captured in the no-light-emission image capturing step; Y1 (m, n) represents the brightness value at the location (m, n) obtained from the image captured in the light-emission image capturing step; and LOG$_x$ represents the logarithm to the base x.

In the present disclosure, with the use of the two light-emitting sources, the color of light emitted from the light-emitting sources is controlled so as to be close to the light-source color of ambient light. Thus, as compared with the case where three light-emitting sources are used, variable control of the light-emitting sources and adjustment of individual difference are easier.

Further, the two light-emitting sources used in the present disclosure are configured so that the color temperatures of light emitted from the respective light-emitting sources are different from each other. In addition, the volumes of light emitted from the two light-emitting sources are determined based on the intersection point of the first line and the line segment. The first line is the line passing through the coordinate point which represents the light-source color of ambient light. The first line is drawn, in the xy chromaticity coordinates, so as to cross the line segment at a predetermined angle. The line segment connects the two coordinate points respectively representing the colors of the two light-emitting sources. With this, the mixed color of combined light from the two light-emitting sources is controlled to be close to the light-source color of ambient light within the range defined by the line segment connecting the two coordinate points respectively representing the colors of the two light-emitting sources. That is, the above arrangement enables flash light to get close to ambient light at least in terms of color temperature.

Further, in the present disclosure, the light volume information indicating the relationship between the volume of ambient light and the total volume of light emitted from the two light-emitting sources, on the basis of the captured image of the subject. Then, on the basis of the above information, the second coordinate point is obtained so as to correspond to the light volume information. The second coordinate point is the point matching the above-mentioned intersection point, or a point on the second line passing: a point close to the intersection point; and the coordinate point corresponding to the light-source color. In addition, White Balance adjustment is performed on the image using the value obtained with reference to the second coordinate point. This, for example, makes it possible to adjust the required light-emission volume for a selected area only, which is selected after separating a main subject from background in a subject area. Further, White Balance adjustment is performed on the basis of the ratio of volume of flash light to the volume of ambient light.

As described above, in the present invention, the color of flash light is controlled so as to be close to the color of ambient light while easiness in variable control of the light-emitting sources is ensured. Further, when the color of flash light is different from the color of ambient light, it is more likely that White Balance adjustment is suitably performed with attention to an area for which adjustment is needed. Note that the light volume information may indicate the ratio of the total volume of light from the two light-emitting sources to the volume of ambient light, for example, or may indicate the ratio of the total volume of light from the two light-emitting sources to the sum of the volume of ambient light and the total volume of light from the two light-emitting sources. Alternatively, the light volume information may include information indicating the volume of ambient light and the total volume of light from the two light-emitting sources, or may include information indicating: the sum of the volume of ambient light and the total volume of light from the two light-emitting sources; and the total volume of light from the two light-emitting sources. As described above, the light volume information is not limited as long as the light volume information indicates a relationship between the light volume related to ambient light and the total volume of light from the two light-emitting sources.

Further, in an embodiment of the present invention, where color information of the mixed color of light emitted from the two light-emitting sources are corrected on the basis of at least two measured values related to the two light-emitting sources, it is not necessary to make measurement in advance for all the types of color information. Further, in an embodiment where coordinate values are corrected with reference to the at least two measured values, it is not necessary to make measurement for all the coordinate values in advance.

Further, in an embodiment of the present invention, where Pe_r, Pe_g, and Pe_b of R, G, and B components of the light-source color of ambient light normalized with respect to G component is calculated on the basis of above-described Equation 1, the light-source color of ambient light is able to be obtained as long as light emitted from the light-emitting sources and reflected off the subject is reflected in the captured image. Furthermore, when, for example, the above calculation method is used in combination with another calculation method in the light-source color obtaining step, more precise estimation of the light-source color is possible by using the two methods complementarily.

Moreover, in an embodiment of the present invention, where the distance information D (m, n) in image signals is obtained in accordance with above-described Equation 2, distance information at each pixel position is suitably obtained from the image captured in the preliminary image capturing step, and the light volume information is suitably obtained with attention to the main subject. This makes it possible to adjust the required light-emission volume for a selected area only, which is selected after separating a main subject from background in a subject area.

According to another aspect, the present invention may be implemented in the form of a program causing a computer to execute the above-described method of the present invention. Such a program is distributable through magnetic recording media such as a flexible disk, optical recording media such as a DVD-ROM, computer-readable recording devices such as a hard disk and a USB flash drive on which the program is recordable, or through downloading via the Internet, for example.

BRIEF DESCRIPTION OF THE DRAWINGS

In FIG. 3B, the two coordinate points at both ends of the line segment respectively correspond to the two measured values, and the coordinate points for the mixed colors on the line segment respectively correspond to the approximate values.

DESCRIPTION OF THE PREFERRED EMBODIMENTS

Figure 1:
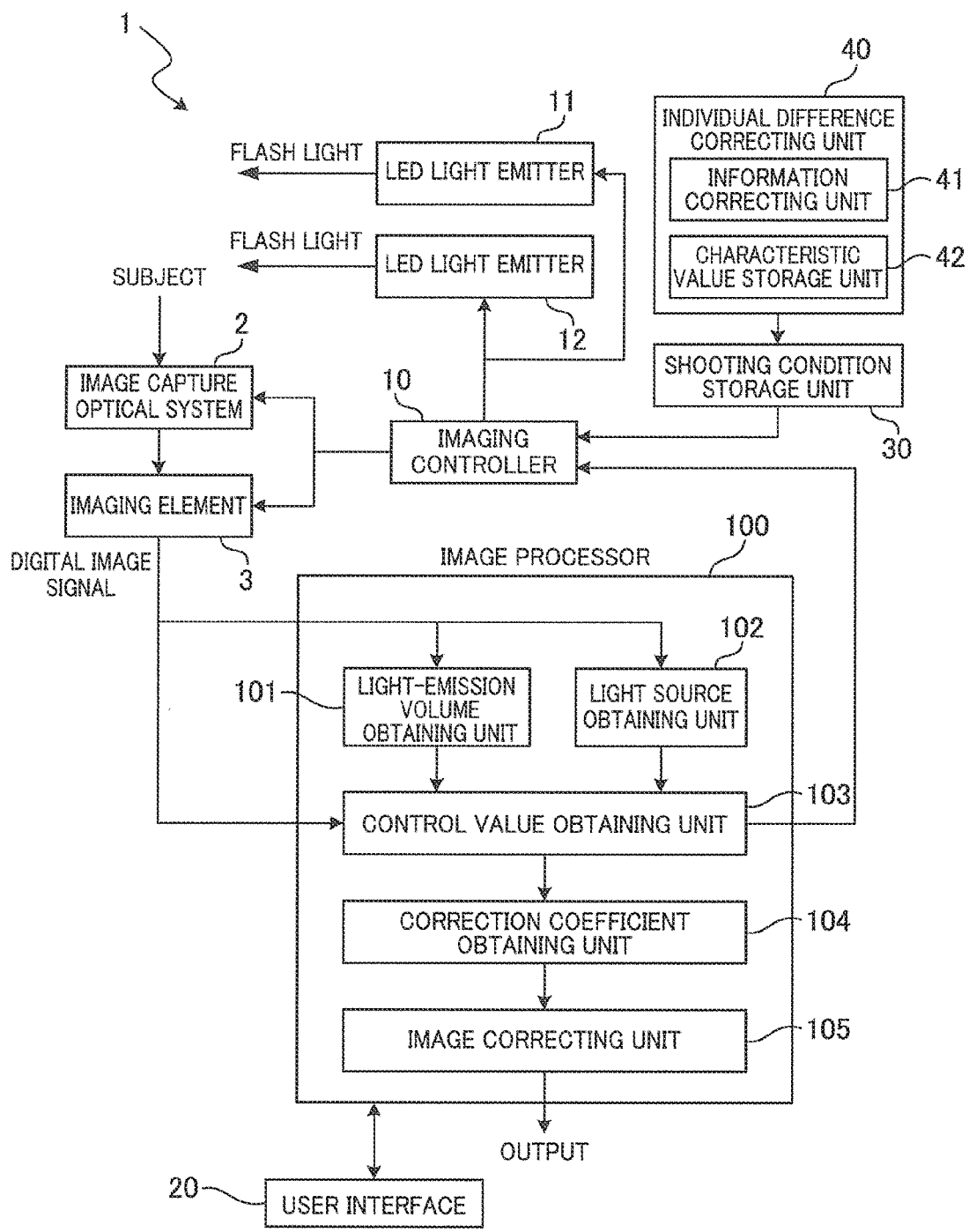
FIG. 1 is a functional block diagram illustrating the configuration of an imaging device related to an embodiment of the present invention.

The following will describe an imaging device 1 related to an embodiment of the present invention, with reference to the drawings. As shown in FIG. 1, the imaging device 1 includes an image capture optical system 2, an imaging element 3, an imaging controller 10, LED light emitters 11 and 12, a user interface 20, a shooting condition storage unit 30, an individual difference correcting unit 40, and an image processor 100. The image capture optical system 2 includes a diaphragm and various types of lenses including a focus lens. The image capture optical system 2 is configured to introduce light from a subject to the imaging element 3 so that an image is formed on the imaging element 3. The imaging element 3 is a CMOS (complementary metal oxide semiconductor) image sensor. The imaging element 3 includes: color filters arranged in a predetermined pattern; a photoelectric conversion element configured to output an analog signal corresponding to the intensity of light received through each color filter; a gain converter configured to convert a gain of the analog signal output from the photoelectric conversion element; and an AD converter configured to convert analog signals to digital signals. A CCD (charge coupled device) image sensor may be adopted as the imaging element 3. In this case, it is only required that a gain converter configured to convert the gain of an analog signal output from the imaging element 3 and an AD converter configured to convert analog signals to digital signals are provided separately from the image element 3. The color filters may be arranged in any arrangement pattern. For example, the color filters may be arranged in a Bayer pattern. In the Bayer pattern, first rows, in each of which R (red) and G (green) elements are alternately arranged in a horizontal direction, and second rows, in each of which G (green) and B (blue) elements are alternately arranged in the horizontal direction, are alternatively arranged in a vertical direction. The imaging element 3 is configured to output image signals indicating an image where pixels are arranged in accordance with the arrangement pattern of the color filters.

Figure 2:
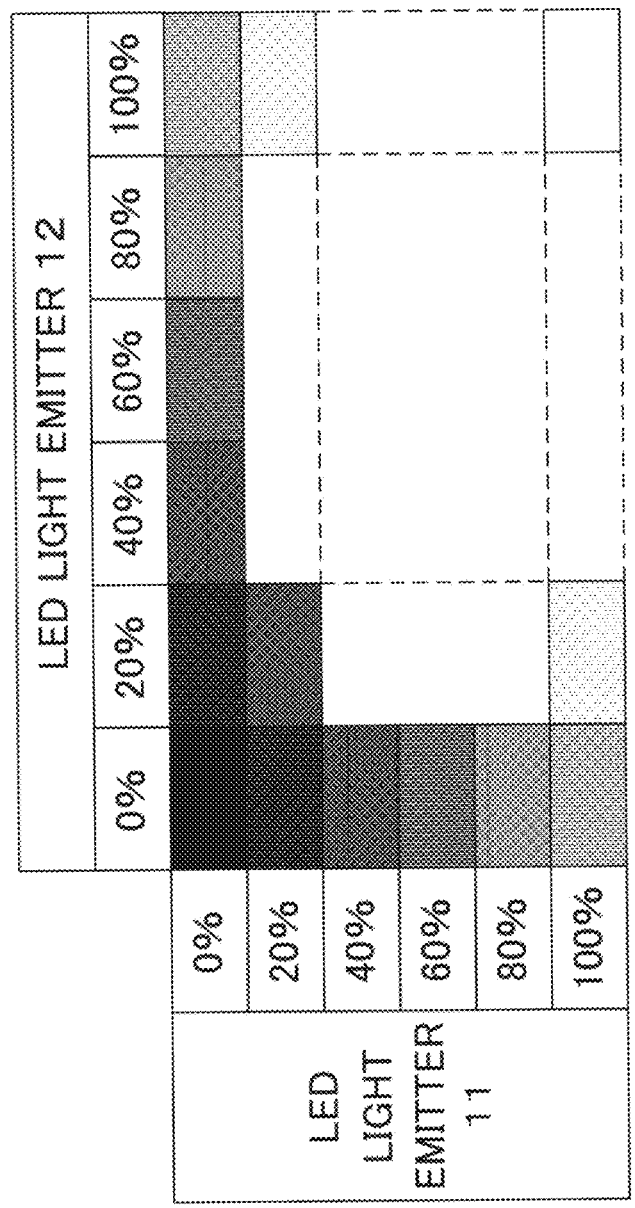
FIG. 2 is a table illustrating the relationship between supply voltages to two LED light emitters and mixed colors producible from two colors of flash light respectively emitted from the two light emitters to a subject.

Each of the LED light emitters 11 and 12 includes an LED element (light-emitting diode in the present disclosure). Each of the LED light emitters 11 and 12 is configured to emit flash light toward a subject, and color temperatures of light emitted from the LED light emitters 11 and 12 are different from each other. To each of the LED elements respectively provided in the LED light emitters 11 and 12, a voltage for controlling the light-emission volume is supplied from a voltage supplier. By changing the magnitude of the supply voltage, the light-emission volume of each of the LED light emitters 11 and 12 is discretely adjusted at a plurality of levels. For example, assuming that the supply voltage for light emission at the maximum light-emission volume is 100%, no light is emitted when the supply voltage is 0%. As the supply voltage is increased in the manner of 20% to 40% to 60% to 80% to 100%, light is emitted from the corresponding LED element with a step-by-step increase of the light-emission volume. When light emitted from the LED light emitter 11 and light emitted from the LED light emitter 12 are applied to the subject at the same time, the color of light applied to the subject is the mixed color produced by the two colors of flash light respectively emitted from the two light emitters. FIG. 2 illustrates the relationship between supply voltages to the two light emitters and mixed colors producible from two colors of flash light respectively applied from the two light emitters to the subject, as a result of such supply of voltage. In the example shown in FIG. 2, the light-emission volume of each of the two light emitters is adjustable at 6 levels. Thus, 36 mixed colors are producible, in total.

Under the control of the imaging controller 10, which will be described later, the image capture optical system 2, the imaging element 3, and the LED light emitters 11 and 12 execute a shooting operation of capturing an image of a subject. There are two modes for the shooting operation: a no-flash mode in which an image of a subject is captured without light emission from the LED light emitters 11 and 12, i.e., without flash; and a flash mode in which an image of a subject is captured with light emission from the LED light emitters 11 and 12, i.e., with flash. In the following, a description will be mainly given for the latter, the operation in the flash mode. The shooting operation in the flash mode includes: a main shooting operation for obtaining a captured image to be finally output; and a preliminary shooting operation for obtaining shooting conditions used in the main shooting operation. In the preliminary shooting operation, after an image of a subject is taken without light emission from the LED light emitters 11 and 12, an image of the subject is taken with flash light applied to the subject from the LED light emitters 11 and 12. Hereinafter, emission of the flash light in the preliminary shooting operation is referred to as "preliminary light emission".

The user interface 20 includes a display with a touch panel, various types of button switches, and the like. A user is capable of operating the touch panel, one or more of the button switches, and/or the like, in accordance with information displayed on the display. Signals indicating the details of operation made by the user are output to the imaging controller 10 and/or the image processor 100.

The shooting condition storage unit 30 stores control information needed to control the LED light emitters 11 and 12, the image capture optical system 2, and the imaging element 3. The following description mainly deals with information stored in the shooting condition storage unit 30 to control the LED light emitters 11 and 12 (hereinafter, this information is referred to as "light emitter control information"). The light emitter control information includes control information A for the preliminary shooting operation, and control information B for the main shooting operation. The control information A for the preliminary shooting operation includes information of current supplied to each of the LED light emitters 11 and 12. The control information A further includes: information of light volume LV0 (APEX value) which is the volume of combined flash light from the LED light emitters 11 and 12; information of CIE xy chromaticity coordinates of the mixed colors of combined flash light from the LED light emitters 11 and 12; and information of the RGB component ratio of each mixed color of combined flash light from the LED light emitters 11 and 12. The information of the light volume, the chromaticity coordinates, the RGB component ratio is associated with the information of current supplied to each of the LED light emitters 11 and 12. The control information B for the main shooting operation includes information of current supplied to each of the LED light emitters 11 and 12. The control information B further includes: information of light volume LV1 (APEX value) which is the volume of combined flash light from the LED light emitters 11 and 12; information of CIE xy chromaticity coordinates (hereinafter, simply referred to as "chromaticity coordinates") of the mixed colors of combined flash light from the LED light emitters 11 and 12; and information of the RGB component ratio of each mixed color of combined flash light from the LED light emitters 11 and 12. The information of the light volume, the chromaticity coordinates, the RGB component ratio is associated with the information of current supplied to each of the LED light emitters 11 and 12.

Figure 3A:
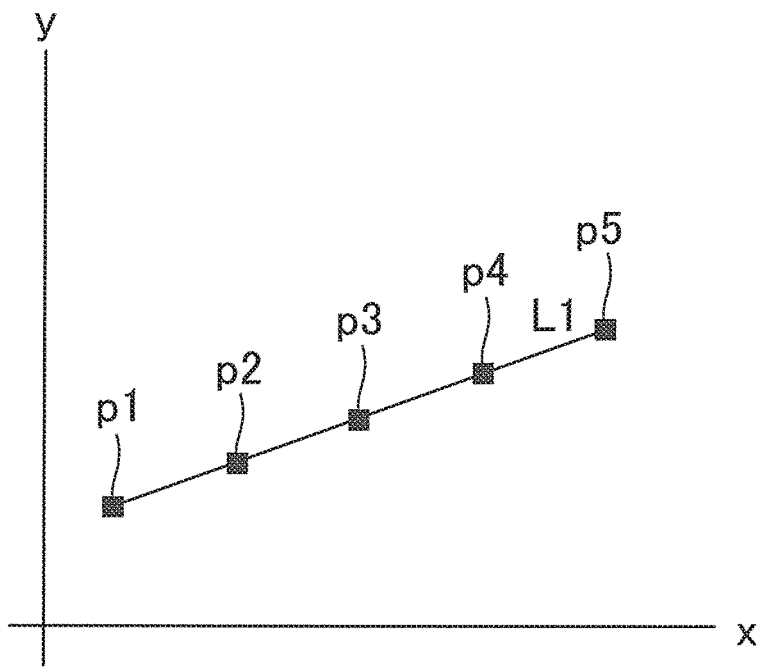
FIG. 3A is a CIE xy chromaticity diagram for all the mixed colors shown in FIG. 2, which are producible from the two colors of flash light. These values are measured using typical LED elements which are average products in terms of individual difference. The measured values are used as reference values for making adjustment related to the individual difference.

The chromaticity coordinates included in the light emitter control information are obtained by measuring the chromaticity of combined light from typical LED elements, which are average products in terms of individual difference. In the chromaticity diagram of FIG. 3A, coordinate points p1 to p5 for light from the typical elements are plotted. The points p1 to p5 are substantially positioned on a line segment L1 connecting the point p1 with the point p5. The point p1 in FIG. 3A corresponds to the color of light applied to a subject when light is emitted from the LED light emitter 11 only. That is, the point p1 directly indicates the color of light emitted from the LED light emitter 11. The point p5 indicates the color of light applied to a subject when light is emitted from the LED light emitter 12 only. That is, the point p5 directly indicates the color of light emitted from the LED light emitter 12. The points p2 to p4 respectively indicate mixed colors produced from two colors of flash light applied to a subject from both of the LED light emitters 11 and 12 at different ratios of the volume of flash light. The ratio of the volume of light emitted from the LED light emitter 12 to the volume of light emitted from the LED light emitter 11 becomes larger with an increase in distance from the point p1. It should be reminded that the table of FIG. 2 shows 36 mixed colors. Thus, 36 points appear in the chromaticity coordinates. All the 36 points are substantially positioned on the line segment L1. For the sake of convenience, only the five points p1 to p5 out of the 36 points are illustrated in FIG. 3A.

Figure 3B:
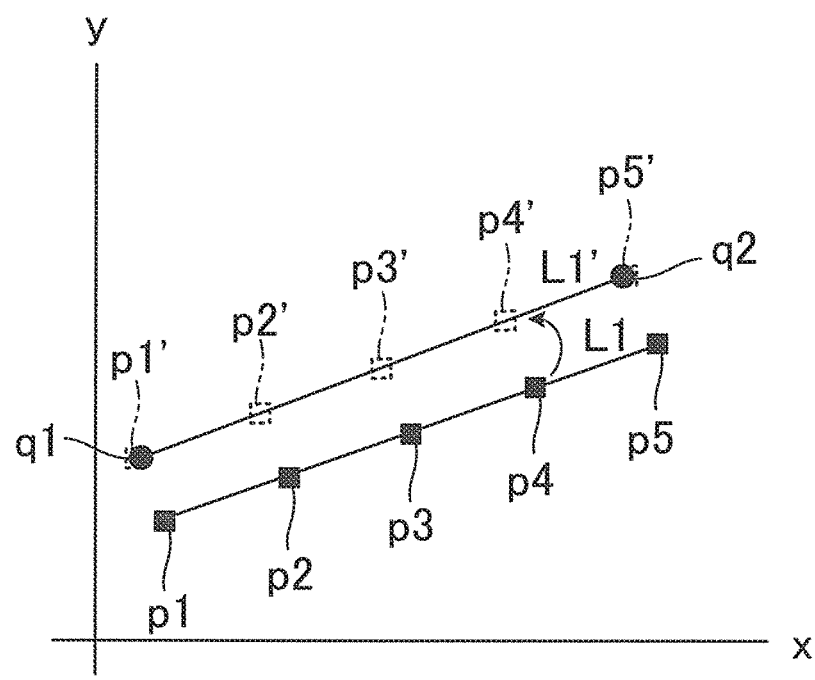
FIG. 3B is a CIE xy chromaticity diagram showing: two measured values respectively obtained when freely-selected two LED elements are individually emitted; and approximate values obtained by performing coordinate transformation on the coordinate points indicating the reference values shown in FIG. 3A so as to be positioned on a line segment defined by two points respectively indicating the two measured values.

The individual difference correcting unit 40 is configured to perform correction on apart of the light emitter control information stored in the shooting condition storage unit 30, to reduce deviation caused by the individual difference of each of the LED light emitters 11 and 12. The information to be corrected is the information obtained by performing measurement using the typical elements, as described above. There may be a difference in characteristics between such a typical element and an LED element which is not the typical product. In other words, there may be an individual difference. To deal with this, the individual difference correcting unit 40 includes: a characteristic value storage unit 42 storing characteristic values of the LED elements actually mounted on the concerned device; and an information correcting unit 41 configured to correct the information stored in the shooting condition storage unit 30 on the basis of the characteristic values. The characteristic values stored in the characteristic value storage unit 42 are: a coordinate value in the chromaticity coordinates which represents the color of light emitted from the LED light emitter 11; and a coordinate value in the chromaticity coordinates which represents the color of light emitted from the LED light emitter 12. These coordinate values are actually measured in the manufacturing process of the imaging device 1 on a product-by-product basis, and are written in the characteristic value storage unit 42, e.g., an EEPROM or the like. Thus, these coordinate values are more accurate characteristic values of the LED elements actually mounted on the concerned device than the original values in the light emitter control information. Points q1 and q2 in FIG. 3B respectively represent examples of characteristic values written in the characteristic value storage unit 42 e.g., the EEPROM or the like. As shown in FIG. 3B, the points p1 and p5 indicated by the original light emitter control information respectively deviate from the points q1 and q2 of the actually-measured values. It is therefore presumed that the other points, such as the points p2 to p4, positioned between the points p1 and p5 also deviate from the corresponding points of the actually-measured values.

On the basis of the characteristic values written in the characteristic value storage unit 42, e.g., the EEPROM or the like, the information correcting unit 41 transforms the 36 points including the points p1 to p5 to 36 new points including points p1' to p5' so that the new points p1' and p5' substantially match the points q1 and q2, respectively. The original 36 points respectively correspond to the coordinate values stored in the shooting condition storage unit 30. For this transformation, the information correcting unit 41 performs coordinates transformation processing such as an affine transformation. The 36 new points are substantially positioned on a line segment L1' connecting the point p1' with the point p5'. In the affine transformation, scaling, rotation, and/or translation is/are performed in the coordinates. The coordinate values of the new points are stored in the shooting condition storage unit 30 as corrected light emitter control information. The corrected light emitter control information stored in the shooting condition storage unit 30 is used by the image processor 100 and the imaging controller 10. Note that the correcting process by the individual difference correcting unit 40 is performed before the shooting operation, for example, when the imaging device 1 is powered on.

The image processor 100 is configured to perform predetermined signal processing on digital image signals output from the imaging element 3, to generate image data corresponding to a subject image. Image data generated by the image processor 100 is output to a display for displaying an image, in the form of image signals for the image to be displayed, or output to a computer-readable recording medium.

The imaging controller 10 is configured to: adjust exposure by controlling the operation of a shutter and/or the diaphragm of the image capture optical system 2; obtain focusing by controlling the operation of the focus lens of the image capture optical system 2; and control the sensitivity and operation of the imaging element 3. In addition, the imaging controller 10 is configured to control the volume of flash light from the LED light emitters 11 and 12. Various types of condition values such as stop, shutter speed, sensitivity, and guide number which are required for the above control are computed by the imaging controller 10 on the basis of the result of computation by the image processor 100.

The imaging controller 10 performs one or more of the above-described control operations selected suitably. As such, the imaging controller 10 controls the image capture optical system 2, the imaging element 3, and the LED light emitters 11 and 12 so as to execute the shooting operation of taking an image of a subject. The imaging controller 10 causes the image capture optical system 2, the imaging element 3, and the LED light emitters 11 and 12 to execute the preliminary shooting operation on the basis of shooting condition values for the preliminary shooting operation computed by the image processor 100. After the preliminary shooting operation, the imaging controller 10 causes the image capture optical system 2, the imaging element 3, and the LED light emitters 11 and 12 to execute the main shooting operation. The imaging controller 10 causes the LED light emitters 11 and 12 and the like to execute the main shooting operation, on the basis of control values computed by the image processor 100.

Functions of the imaging controller 10, the shooting condition storage unit 30, the individual difference correcting unit 40, the user interface 20, and the image processor 100 are implemented by: hardware constituted by a CPU, a storage device such as a memory, and various types of interfaces; and software constituted by various types of data such as program data stored in the storage units. The hardware and the software cooperate with each other. Alternatively, the functions of the imaging controller 10, the shooting condition storage unit 30, the individual difference correcting unit 40, the user interface 20, and the image processor 100 may be implemented by combination of the functions provided by the hardware and the software cooperating with each other and functions of a dedicated circuit such as an ASIC.

The following will describe the image processor 100 in detail. The following description mainly deals with a process of computing control values for the LED light emitters 11 and 12, and a process of correcting an image. The image processor 100 may be configured to compute other control values and to perform other types of processing on an image. The image processor 100 includes a light-emission volume obtaining unit 101, a light source obtaining unit 102, a control value obtaining unit 103, a correction coefficient obtaining unit 104, and an image correcting unit 105.

The light-emission volume obtaining unit 101 is configured to calculate a total volume of light emitted from the LED light emitters 11 and 12 ("total light-emission volume") which is required for the main shooting. The light-emission volume obtaining unit 101 is configured to derive a first luminance signal from digital image signals output from the imaging element 3 in shooting without preliminary light emission, and to derive a second luminance signal from digital image signals output from the imaging element 3 in shooting with preliminary light emission. Then, the light-emission volume obtaining unit 101 analyzes the difference between the first and second luminance signals. On the basis of the result of the analysis, the light-emission volume obtaining unit 101 calculates the total light-emission volume of the LED light emitters 11 and 12 required for the main shooting operation.

The light source obtaining unit 102 is configured to estimate the light-source color of first ambient light on the basis of digital image signals output from the imaging element 3. In this embodiment, when the imaging device 1 is powered on to be activated, the operation mode of the device is set to a mode in which digital image signals corresponding to the moving image of a subject without flash are output from the imaging element 3. When digital image signals for a still image are regarded as signals of a single frame, digital image signals for a moving image are signals of a plurality of frames successively output from the imaging element 3 at predetermined time intervals. The light source obtaining unit 102 calculates, for each frame, an average value of RGB pixel signals in an area estimated to correspond to the white color in a subject. This value is used as a value indicating the light-source color of the first ambient light. Note that the light source obtaining unit 102 may estimate the light-source color of the first ambient light from a signal component corresponding to specular reflection light after separating diffuse reflection light from specular reflection light in light reflected off the subject, based on the image signals for a single frame. The light source obtaining unit 102 outputs the thus estimated light-source color of the first ambient light to the control value obtaining unit 103. The light-source color of the first ambient light is used when calculating a White Balance coefficient set and color reproduction matrix for shooting without flash. The description thereof is omitted.

The light source obtaining unit 102 is configured to calculate the light-source color of second ambient light, as follows, on the basis of digital image signals obtained by shooting with preliminary light emission in the preliminary shooting operation and digital image signals obtained by shooting without preliminary light emission in the preliminary shooting operation.

First, the light source obtaining unit 102 generates brightness distribution information Y0 (m, n) on the basis of digital image signals output from the imaging element 3 when an image of a subject is taken without preliminary light emission. (m, n) designates location. When the image is divided, in the horizontal and vertical directions, into blocks each constituted by a predetermined number of pixels, the location of the block in the mth column with respect to the horizontal direction and in the nth row with respect to the vertical direction is denoted by (m, n). Hereinafter, the block in the mth column and in the nth row is referred to as "block (m, n)". Thus, the image is divided into blocks each constituted by a plurality of pixels, and computation is performed for each block. With this, the computation amount is smaller than the case where computation is performed for each pixel. However, computation may be performed for each pixel. Y0 (m, n) represents the brightness value of the block (m, n) of an image of a subject taken without preliminary light emission. The light source obtaining unit 102 further generates color distribution information C0_$r$ (m, n), C0_$g$ (m, n), and C0_$b$ (m, n), on the basis of the digital image signals output from the imaging element 3 when the image of the subject is taken without preliminary light emission. The color distribution information C0_$r$ (m, n), C0_$g$ (m, n), and C0_$b$ (m, n) respectively correspond to the average values of R, G, and B signals in the pixels included in the block (m, n). Note that, instead of each average value, the sum of the pixel values in the block (m, n), or any of the pixel values in the block (m, n) may be used for the color distribution information.

Then, the light source obtaining unit 102 generates brightness distribution information Y1 (m, n) on the basis of digital image signals output from the imaging element 3 when an image of the subject is taken with preliminary light emission in the preliminary shooting operation. Y1 (m, n) represents the brightness value of the block (m, n) in the image of the subject taken with preliminary light emission. The light source obtaining unit 102 further generates color distribution information C1_$r$ (m, n), C1_$g$ (m, n), and C1_$b$ (m, n) on the basis of the digital image signals output from the imaging element 3 when the image of the subject is taken with preliminary light emission. The color distribution information C1_$r$ (m, n), C1_$g$ (m, n), and C1_$b$ (m, n) respectively corresponding to the average values of R, G, and B signals in the pixels included in the block (m, n). Note that, instead of each average value, the sum of the pixel values in the block (m, n), or any of the pixel values in the block (m, n) may be used for the color distribution information.

Then, the light source obtaining unit 102 obtains, from the magnitude of the difference between Y1 and Y0 (=Y1 (m, n)−Y0 (m, n)), weight distribution Wt (m, n) representing reliability in evaluation of light sources for each block. Wt (m, n) is set so that its value monotonously increases in accordance with the magnitude of the difference between Y1 and Y0. For example, the value of Wt (m, n) may increase at multiple levels in accordance with the magnitude of the difference between Y1 and Y0, or may be selected from two values after comparing the difference between Y1 and Y0 with a single threshold value. The magnitude of the difference between Y1 and Y0 corresponds to the volume of reflected flash light emitted from the LED light emitters 11 and 12. Accordingly, the value of Wt (m, n) corresponds to the volume of reflected flash light.

Then, the light source obtaining unit 102 normalizes the color distribution information with respect to G signal, by performing, for each block, computation corresponding to the equations described below. With this, the light source obtaining unit 102 obtains a color component ratio P0_$r$ (m, n):P0_$g$ (m, n):P0_$b$ (m, n), and a color component ratio P1_$r$ (m, n):P1_$g$ (m, n):P1_$b$ (m, n), for the block (m, n).

P0_$i$ (m, n)=C0_$i$ (m, n)/C0_$g$ (m, n) (where i designates each of r, g and b)

P1_$i$ (m, n)=(C1_$i$ (m, n)−C0_$i$ (m, n))/(C1_$g$ (m, n)−C0_$g$ (m, n)) (where i designates each of r, g, and b)

Then, the light source obtaining unit 102 obtains a color component ratio P2_$r$:P2_$g$:P2_$b$ for flash light, by performing computation corresponding to the equation described below. Note that F_r, F_b, and F_g respectively correspond to R, G, and B components of the mixed color of combined flash light emitted from the LED light emitters 11 and 12 at the time of preliminary light emission. These values are obtained from the light emitter control information A stored in the shooting condition storage unit 30. Note that F_r, F_b, and F_g are normalized with respect to G component, in advance. That is, F_g=1.

P2_$i$=F_$i$ (where i designates each of r, g, and b)

Then, on the basis of the color component ratios obtained as above, the light source obtaining unit 102 obtains a color component ratio Pe_r (m, n):Pe_g (m, n):Pe_b (m, n) indicating the color of ambient light for the block (m, n), by performing computation corresponding to the following equation for each block.

Pe_$i$ (m, n)=P0_$i$ (m, n)*P2_$i$/P1_$i$ (m, n) (where i designates each of r, g, and b)

Then, the light source obtaining unit 102 calculates weighted average values <Pe_r>, <Pe_g>, and <Pe_b> with respect to Pe_i (m, n), using weight Wt (m, n). Note that ΣX means the summation of X-values for every block (m, n).

$$<Pe\_r>=\Sigma(Pe\_r(m,n)*Wt(m,n))/\Sigma Wt(m,n)$$

$$<Pe\_g>=\Sigma(Pe\_g(m,n)*Wt(m,n))/\Sigma Wt(m,n)$$

$$<Pe\_b>=\Sigma(Pe\_b(m,n)*Wt(m,n))/\Sigma Wt(m,n)$$

In the above computation, values are normalized with respect to G component. Accordingly, the values of P0_$g$, P1_$g$, P2_$g$, and <Pe_g> are 1. Therefore, the computation may be performed only for the elements of R and B components, while the values of the elements for G component are set to 1 by default.

The light source obtaining unit 102 obtains <Pe_r>, <Pe_g>, and <Pe_b> indicating the light-source color of the second ambient light in this way. These values are obtained through weighted average using the weight Wt (m, n) indicating the reliability of the block (m, n). This increases the possibility that the color component ratio of the block in which the volume of reflected flash light is larger and which has higher reliability contributes to the calculation result, as compared with the color component ratio of the block in which the volume of reflected flash light is smaller and which has lower reliability. This increases accuracy of calculation of the light-source color of the second ambient light. The reason why the light-source color of the second ambient light is calculated in the above-described manner will be described later. The light source obtaining unit 102 outputs <Pe_r>, <Pe_g>, and <Pe_b> to the control value obtaining unit 103.

The control value obtaining unit 103 computes various types of condition values used in the main shooting operation, on the basis of digital image signals output from the imaging element 3 in the preliminary shooting operation.

First, the control value obtaining unit 103 obtains distance information, which is information of the distance from the imaging device 1 for each position in an image, on the basis of the digital image signals output when the image of the subject is taken in the preliminary shooting operation. For example, the distance information is obtained on the basis of the difference in brightness in each position in the image between shooting with preliminary light emission and shooting without preliminary light emission. The control value obtaining unit 103 computes distance information D (m, n) in the block (m, n) on the basis of Y0 (m, n) and Y1 (m, n) obtained by the light source obtaining unit 102, as follows, for example. LV0 is obtained from the light emitter control information A stored in the shooting condition storage unit 30. log x is the logarithm to the base x.

$$D(m,n) = (LV0 - \log_2(Y1(m,n)/Y0(m,n)-1))/2$$

Figure 4A:
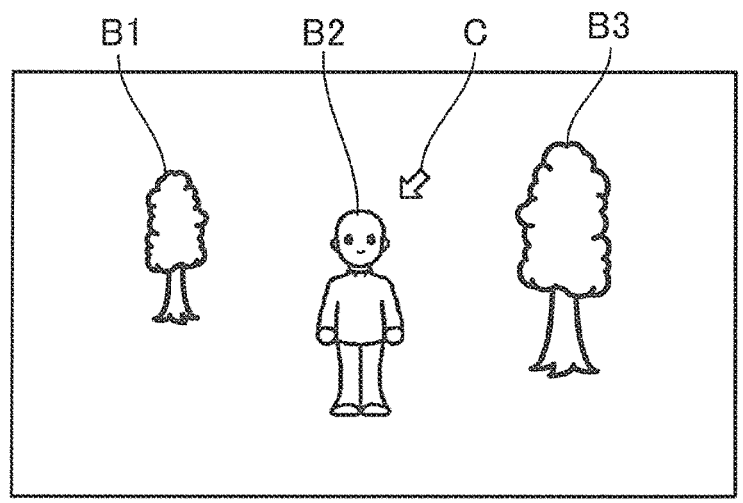
FIG. 4A illustrates an example of a scene from which an image is taken.
Figure 4B:
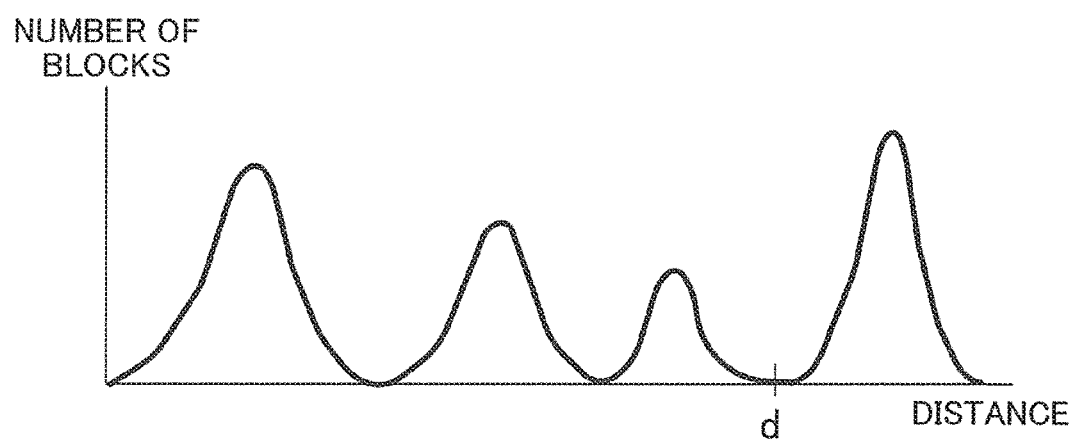
FIG. 4B is a graph showing the distribution of blocks, divided from an image captured from the scene shown in FIG. 4A, with respect to the distance to subjects.

Then, the control value obtaining unit 103 divides the area of the image into: a main subject area for a main subject and the remaining area on the basis of distance information D (m, n) and information input by a user through the user interface 20. The control value obtaining unit 103 generates block distribution information with respect to the distance, on the basis of distance information D (m, n). For example, let us assume that distribution information shown in FIG. 4B is generated from an image taken from a scene shown in FIG. 4A. As shown in FIG. 4B, there are a plurality of peaks in the block distribution. Among the plurality of peaks, there are the rightmost peak at the largest distance and the second-right peak at the second largest distance. A distance information value d at the turning point between these two peaks is considered as a threshold. Each block (k1, l1) having the value of D (k1, l1) larger than the distance information value d is regarded as belonging to a background area. Meanwhile, each block (k2, l2) having the value of D (k2, l2) smaller than the distance information value d is regarded as belonging to subject areas respectively indicated by B1 to B3 in FIG. 4A. One of the subjects B1 to B3 should be the subject which the user considers as the most important. Hereinafter, such a subject is referred to as a "main subject". The control value obtaining unit 103 causes the image of the scene of FIG. 4A to be displayed on the display, and instructs the user interface 20 to make the user select the main subject. In this process, the control value obtaining unit 103 generates information indicating which of areas (the subject areas B1 to B3 and the background area) each block in the image belongs to, on the basis of the value of D (m, n) and the distribution information shown in FIG. 4B. Then, the control value obtaining unit 103 instructs the user interface 20 to display, on the display, an indicator image (e.g., an arrow C in FIG. 4A) showing the user which one of the subjects is currently selected on the basis of the above-described information. The user selects one of the subjects B1 to B3 as the main subject via a button or the like, referring to the indicator image displayed on the display. Referring to the selection made by the user, the control value obtaining unit 103 categorizes each block as the block belonging to the main subject area or as the block belonging to the remaining area which is not the main subject area. Note that the control value obtaining unit 103 may automatically categorize each area as the block belonging to the main subject area or as the block belonging to the remaining area, on the basis of the distance information D (m, n), without relying on input by the user. For example, the control value obtaining unit 103 may select the subject having the shortest distance from the device as the main subject, out of the subjects B1 to B3.

Then, the control value obtaining unit 103 computes the ratio of the volume of flash light to the total volume of light, which is the sum of the volume of ambient light and the volume of flash light, on the basis of: information of the above-described categorization of the blocks into the blocks belonging to the main subject area and the blocks belonging to the remaining area; and brightness distribution information for each block. Hereinafter, this ratio is referred to as a "flash light volume ratio" First, the control value obtaining unit 103 generates weight distribution Wc (m, n). The weight for blocks belonging to the main subject area is a while the weight for the blocks belonging to the remaining area is β. The weights α and β are determined by adjusting the relative magnitude relationship between a and R, depending on whether the balance between the ambient light and the flash light in the main subject area is highly considered in processing for the blocks belonging to the remaining area.

$$Wc(m, n) = \alpha(\text{block } (m, n) \in \text{main subject area})$$
$$= \beta(\text{block } (m, n) \notin \text{main subject area})$$

Further, the control value obtaining unit 103 calculates, from Y0 (m, n) and Y1 (m, n), a reference value r (m, n) for the block (m, n) functioning as a basis of calculation of the flash light volume ratio, as follows. LV0 and LV1 are obtained from the shooting condition storage unit 30.

$$r(m,n) = \log_2[(Y1(m,n)-Y0(m,n))/Y0(m,n)] + (LV1 - LV0)$$

Then, the control value obtaining unit 103 calculates the flash light volume ratio R (light volume information) as follows. The flash light volume ratio R represents the ratio of the volume of flash light to the total volume of light required for the main shooting operation, i.e., to the volume of compound light of ambient light and flash light.

$$R = (A/(A+1))$$

$$A = 2^{(\Sigma(r(m,n) * Wc(m,n))/\Sigma Wc(m,n))}$$

Then, the control value obtaining unit 103 calculates the color of the compound light of ambient light and flash light in the main shooting operation as follows, on the basis of: the flash light volume ratio R; the color of ambient light obtained by the light source obtaining unit 102; and the information stored in the shooting condition storage unit 30. The above-mentioned information stored in the shooting condition storage unit 30 is, specifically, the information of the coordinates of the mixed colors after correction by the individual difference correcting unit 40. In other words, the above-mentioned information is the information including the coordinates points p1' to p5' in FIG. 3B.

The control value obtaining unit 103 first selects one of the light-source colors calculated by the light source obtaining unit 102, that is, the light-source color of the first ambient light and the light-source color of the second ambient light. According to the above-described method of estimating the light-source color of the first ambient light, there is a possibility that the light-source color cannot be appropriately obtained when the white area in an image of a subject is relatively smaller, and/or when the ratio of specular reflection light to light reflected from the subject is relatively smaller. Thus, the control value obtaining unit 103 selects the light-source color of the second ambient light when the white area in the image of the subject is relatively smaller, and/or when the ratio of specular reflection light to light reflected off the subject is relatively smaller. To the contrary, when the white area in the image of the subject is relatively larger, and/or when the ratio of specular reflection light to light reflected off the subject is relatively larger, the control value obtaining unit 103 selects the light-source color of the first ambient light. Whether the white area in the image of the subject is relatively smaller or not, and whether the ratio of specular reflection light to the light reflected off the subject may be determined by comparing the size of the white area to a predetermined threshold value, and comparing the ratio of specular reflection light to a predetermined threshold value, respectively. In the following description, the color component ratio of the light-source color selected from the light-source colors of the first and second ambient light is denoted by Pr:Pg:Pb. When the light-source color of the first ambient light is selected, the values of Pr, Pg, and Pb correspond to the values of R, G, and B components of the light-source color of the first ambient light which are normalized with respect to G component. When the light-source color of the second ambient light is selected, P r=<Pe_r>, Pg=<Pe_g>, and Pb=<Pe_b>.

Figure 5A:
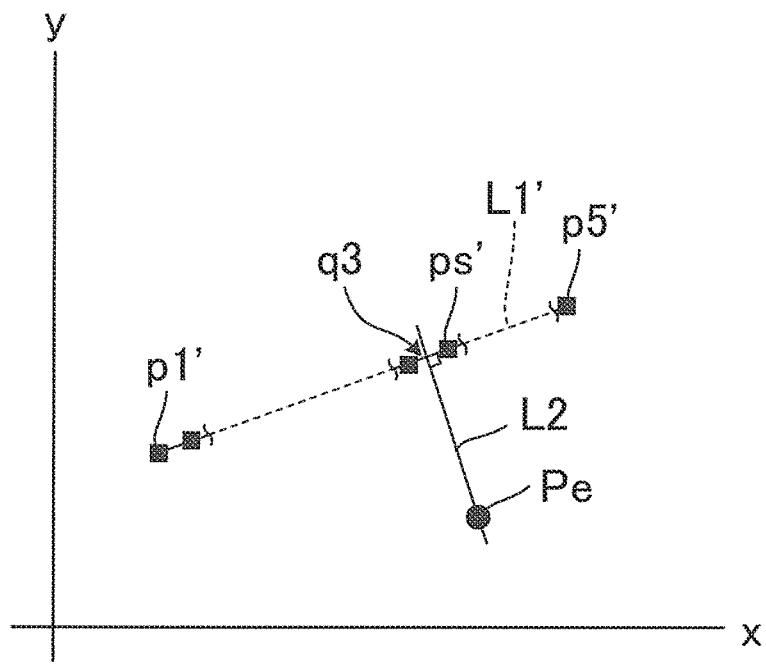
FIG. 5A and FIG. 5B each is a CIE xy chromaticity diagram showing a light-source color (Pe) of ambient light and the mixed colors of combined light emitted from the LED light emitters.
Figure 5B:
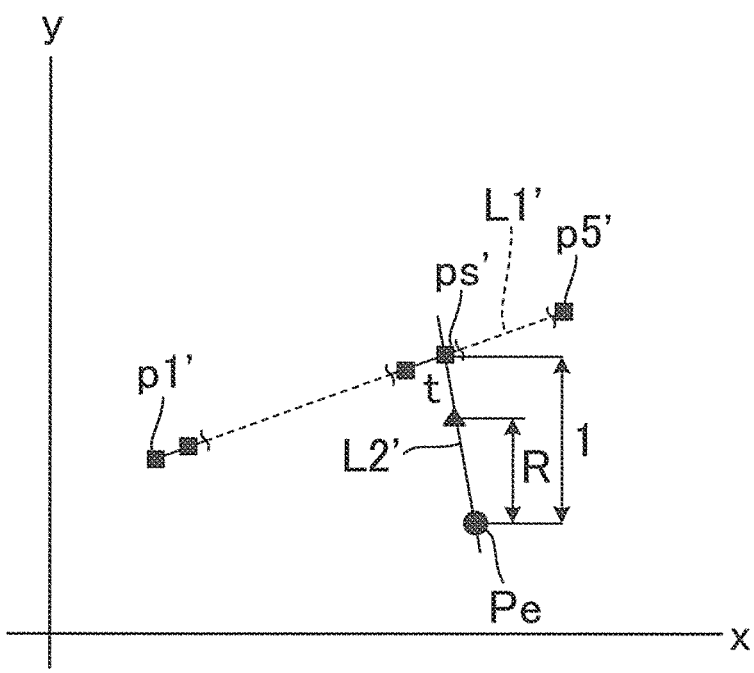

The control value obtaining unit 103 calculates the coordinate point q3 in the chromaticity coordinates shown in FIG. 5A. The coordinate point q3 corresponds to the intersection point of a line segment L1' and a line L2. The line segment L1' connects the coordinate point p1' corresponding to the color of light emitted from the LED light emitter 11 and the coordinate point p5' corresponding to the color of light emitted from the LED light emitter 12. The line L2 is orthogonal to the line segment L1' and passes through a coordinate point Pe corresponding to the color of ambient light. Thus, the coordinate point q3 is the point closest to the coordinate point Pe among the points on the line segment L1'. The coordinate point Pe corresponding to the color of which color component ratio is Pr:Pg:Pb.

Figure 6:
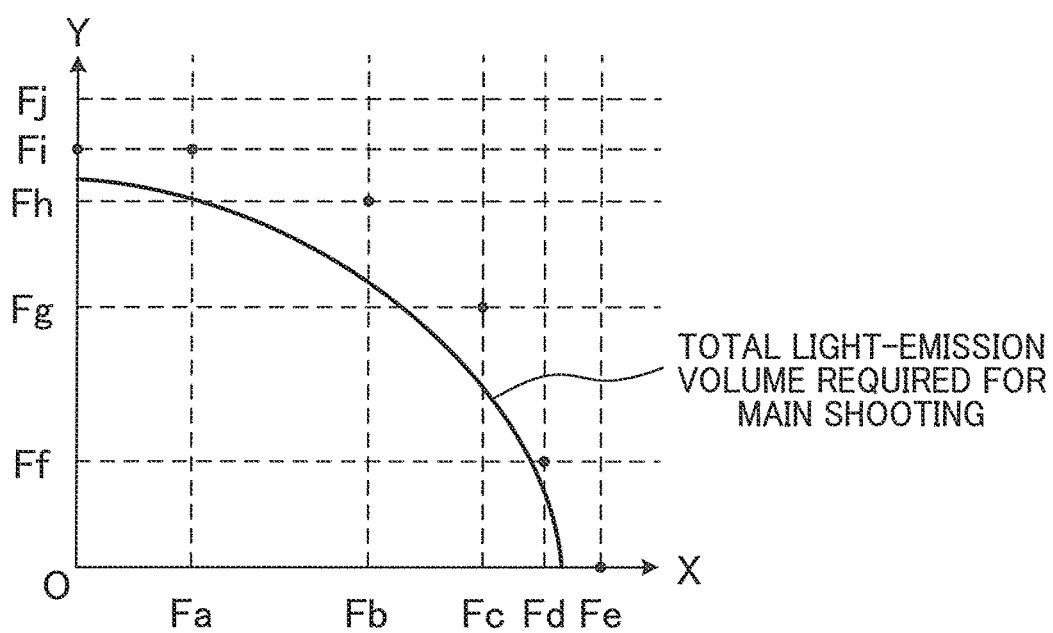
FIG. 6 is a graph showing the relationship between the light volume of each of the two LED light emitters and the total light-emission volume required for main shooting operation.

Then, the control value obtaining unit 103 extracts a point corresponding to the light volume close to the volume of flash light in the main shooting, among the points close to the coordinate point q3 in the chromaticity coordinates out of the 36 points on the line segment L1' corresponding to the mixed colors of combined light emitted from the LED light emitters 11 and 12 (the new points after correction by the individual difference correcting unit 40). This is because the 36 points are positioned on the line segment L1' discretely, and therefore any of the 36 points does not always match the coordinate point q3. If any of the 36 points matches the coordinate point q3, the point matching the coordinate point q3 may be extracted. In the example of FIG. 5A, a point ps' is extracted. The process of extracting the point ps' includes two steps, as follows. In a first extraction step, first, a plurality of points the light volume of each of which is close to the volume of flash light required for the main shooting operation is extracted from the 36 points, on the basis of the light-emission volume required for the main shooting operation obtained by the light-emission volume obtaining unit 101. FIG. 6 illustrates an example of the way of extraction. The abscissa axis X in FIG. 6 represents the light-emission volume of the LED light emitter 11. The light-emission volumes Fa, Fb, Fc, Fd, and Fe respectively correspond to the supply voltages to the LED light emitter 11 of 0, 20, 40, 60, 80, and 100%. The ordinate axis Y in FIG. 6 represents the light-emission volume of the LED light emitter 12. The light-emission volumes Ff, Fg, Fh, Fi, and Fj respectively correspond to the supply voltages to the LED light emitter 12 of 0, 20, 40, 60, 80, and 100%. Broken lines respectively represent lines of X=Fa, X=Fb, X=Fc, X=Fd, X=Fe, Y=Ff, Y=Fg, Y=Fh, Y=Fi, and Y=Fj. A curve line in FIG. 6 represents the relationship between: the total light-emission volume required for the main shooting operation; and the light-emission volumes of the respective LED light emitters 11 and 12. The control value obtaining unit 103 extracts grid points which are respectively on the lines of X=0, Fa, Fb, Fc, Fd, and Fe, and located over and closest to the curve line. The grid points are points on the intersection of the grid formed by the broken lines and the coordinates. Six black points shown in FIG. 6 are the thus extracted points. In a second extraction step, out of the points extracted in the first extraction step, the point having the light-emission volume ratio closest to that corresponding to the coordinate point q3 in the chromaticity coordinates is extracted as the point representing the light-emission volume ratio corresponding to the point ps'. For example, out of the six points shown in FIG. 6, the point having the light-emission volume ratio closest to that corresponding to the coordinate point q3 is extracted.

The thus extracted point ps' represents one of the 36 mixed colors shown in FIG. 2. Therefore, the point ps' represents the light-emission volumes of the respective LED light emitters 11 and 12, and the light-emission volumes are thus determined. The extraction of the point ps' determining each of the light-emission volumes of the LED light emitters 11 and 12 in this way corresponds to obtaining "a predetermined point close to the intersection point of the first line and a line segment in the xy chromaticity coordinates" in the present invention.

In the main shooting operation, the imaging controller 10 controls the LED light emitters 11 and 12 to emit light so that the light-emission volumes of the light emitters 11 and 12 are respectively equal to those corresponding to the point ps' obtained by the control value obtaining unit 103. Specifically, the imaging controller 10 controls the voltage supplier so that the respective voltages for the LED light emitters 11 and 12 cause their respective light-emission volumes become equal to those corresponding to the point ps'.

The control value obtaining unit 103 further obtains a coordinate point t representing the color of compound light ("shooting light") of flash light with ambient light in the main shooting operation. The coordinate point t is a point on a line L2' passing through both points Ps' and Pe. The point t satisfies that the ratio of the distance between P4' and Pe to the distance between t and Pe is 1:R.

The correction coefficient obtaining unit 104 obtains the White Balance coefficient set and color reproduction matrix for correcting digital image signals obtained in the main shooting operation in the below-described manner, on the basis of the coordinate point t obtained by the control value obtaining unit 103. The White Balance coefficient set is constituted by three real numbers. By the three real numbers, R, G, and B signals of each pixel in image data are respectively multiplied. The color reproduction matrix is a matrix of three columns and three rows, by which a vector obtained by combining three factors of R, G, and B signals in each pixel in the image data is multiplied. The correction coefficient obtaining unit 104 holds reference values of the White Balance coefficient set and reference values of the color reproduction matrix, each set of which reference values are associated with the light-source colors of multiple types of reference light sources. The correction coefficient obtaining unit 104 extracts a plurality of reference light sources respectively having the light-source colors close to the color corresponding to the coordinate point t. Then, the correction coefficient obtaining unit 104 obtains the White Balance coefficient set and the color reproduction matrix for correcting the digital image signals, by performing interpolation computation on the reference values respectively associated with the extracted reference light sources, depending on the difference between the light-source color of each of the extracted reference light sources and the color corresponding to the coordinate point t.

Thereafter, the image correcting unit 105 performs a White Balance correcting process and a color reproduction process on the digital image signals output from the imaging element 3 during the main shooting operation, using the White Balance coefficient set and color reproduction matrix for the coordinate point t which are obtained by the correction coefficient obtaining unit 104. To be more specific, R, G, and B signals of each pixel included in the digital image signals output from the imaging element 3 in the main shooting operation are multiplied by the respective values of the White Balance coefficient set and by the color reproduction matrix. As described above, in the main shooting operation, the imaging controller 10 controls the LED light emitters 11 and 12 so that flash light, the total volume of which corresponds to that of the point ps', is applied to the subjects. That is, shooting light (combined light of flash light and ambient light applied to the subjects) applied to the main subject, i.e., the subject B2 in FIG. 5A, has the color represented by the coordinate point t. Therefore, the digital image signals output from the imaging element 3 in the main shooting operation are corrected to be signals representing a color close to the original color of the subjects by performing the White Balance correcting process and the color reproduction process on these digital image signals, using the White Balance coefficient set and the color reproduction matrix which are obtained by the correction coefficient obtaining unit 104 with reference to the coordinate point t.

Figure 7:
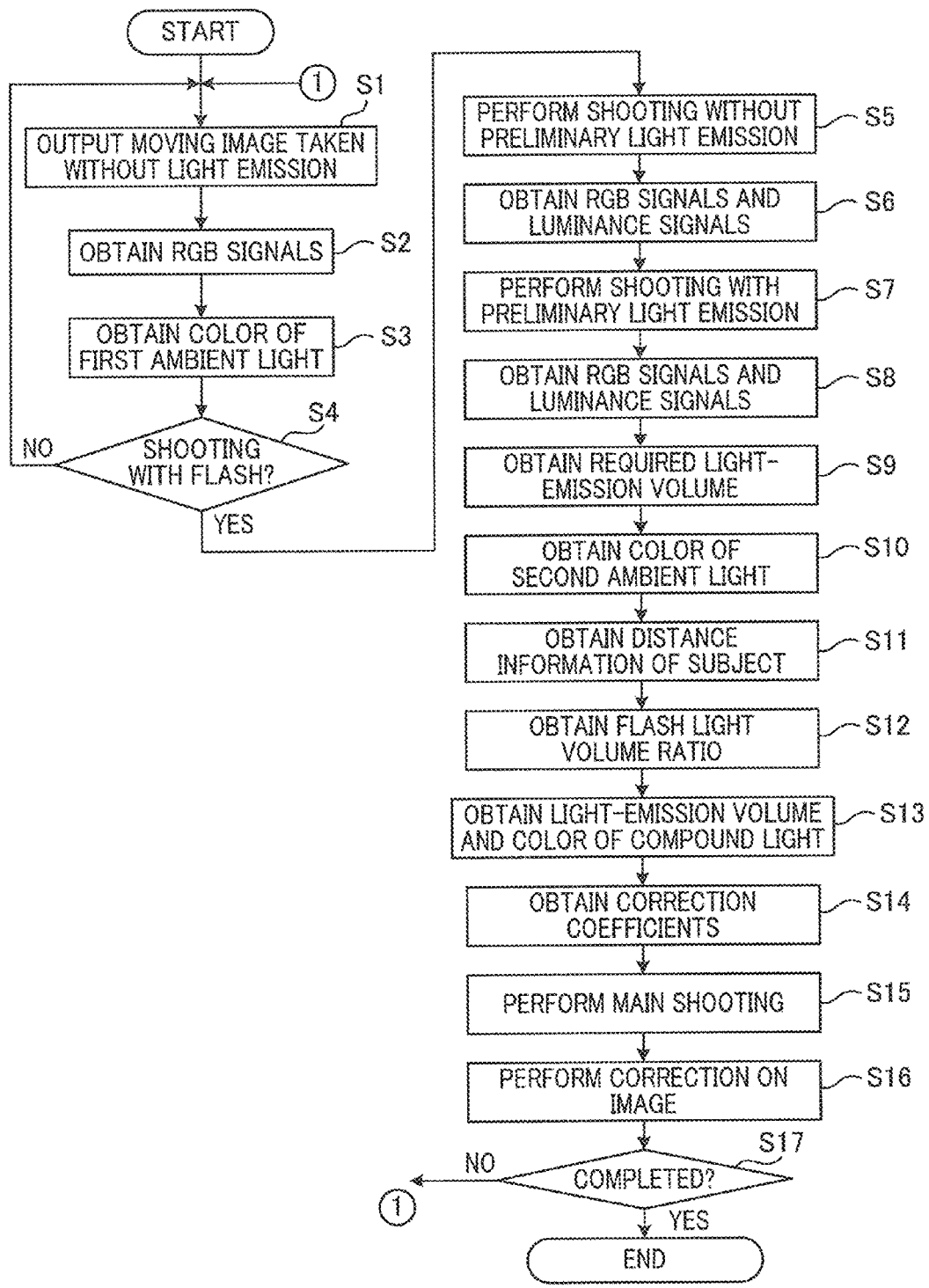
FIG. 7 is a flowchart illustrating a series of actions in shooting operation using the imaging device.

The following will describe the flow of a series of actions in the shooting operation carried out using the imaging device 1, with reference to FIG. 7. When powered on, the imaging device 1 is automatically set in the operation mode in which digital image signals corresponding to a moving image are output from the imaging element 3 taken without emission of flash light (Step S1). Then, the image processor 100 obtains RGB pixel signals for each frame of the moving image output from the imaging element 3 (Step S2). Then, the light source obtaining unit 102 estimates the light-source color of the first ambient light, on the basis of the RGB pixel signals for each frame (Step S3). Thereafter, it is determined whether shooting is performed with flash (Step S4). When it is determined that shooting is performed without flash (Step S4: No), Step S1 is executed. When it is determined that shooting is performed with flash (Step S4: Yes), the imaging controller 10 causes the image capture optical system 2 and the imaging element 3 to perform the first process of the preliminary shooting operation, which is shooting without preliminary light emission (Step S5). The image processor 100 obtains brightness information such as brightness distribution information Y0 (m, n) and RGB pixel signals, on the basis of digital image signals output from the imaging element 3 in this process (Step S6). Then, the imaging controller 10 causes the image capture optical system 2, the imaging element 3, and the LED light emitters 11 and 12 to perform the second process of the preliminary shooting operation, which is shooting with preliminary light emission (Step S7). The image processor 100 obtains brightness information such as the brightness distribution information Y1 (m, n) and RGB pixel signals, on the basis of digital image signals output from the imaging element 3 in this process (Step S8). Then, on the basis of the brightness information obtained in Steps S6 and S8, the light-emission volume obtaining unit 101 calculates the total light-emission volume of the LED light emitters 11 and 12 required for the main shooting operation (S9). Then, the light source obtaining unit 102 obtains the light-source color of the second ambient light, on the basis of the brightness information obtained in Steps S6 and S8 (Step S10).

Thereafter, the control value obtaining unit 103 obtains distance information D (m, n) on the basis of the brightness distribution information Y0 (m, n) and Y1 (m, n) respectively obtained in Steps S6 and S8 (Step S11). Then, the control value obtaining unit 103 obtains the flash light volume ratio R on the basis of the distance information D (m, n) obtained in Step S11 (Step S12). Then, the control value obtaining unit 103 obtains the coordinate point t representing the color of compound light of flash light with ambient light, i.e., the color of shooting light (Step S13). In Step S13, first, the point ps' is obtained on the basis of: the required light-emission volume obtained in Step S9; and the light emitter control information stored in the shooting condition storage unit 30. The point ps' is a point in the chromaticity coordinates, which represents the light-emission volume of the LED light emitter 11 and the light-emission volume of the LED light emitter 12. After that, the coordinate point t is obtained on the basis of: the flash light volume ratio R obtained in Step S12; the chromaticity coordinate point Pe corresponding to one of the light-source colors (Pr:Pg:Pb) of the first and second ambient light respectively obtained in Steps S3 and S10; and the point ps'. Then, the correction coefficient obtaining unit 104 obtains correction coefficients (the White Balance coefficient set and the color reproduction matrix) on the basis of the coordinate point t obtained in Step S13 (Step S14). Then, the imaging controller 10 causes the image capture optical system 2, the imaging element 3, and the LED light emitters 11 and 12 to perform the main shooting operation, on the basis of: the point ps' obtained in Step S13; the light emitter control information stored in the shooting condition storage unit 30; and the like (Step S15). Then, the image correcting unit 105 performs correction (the White Balance adjustment process and the color reproduction process) on digital image signals output from the imaging element 3 in the main shooting operation executed in Step S15, using the correction coefficients obtained in Step S14 (Step S16). When it is determined that processing has been completed (Step S17: Yes), the imaging device 1 ends the routine. When it is determined that the processing has not been completed (Step S17: No), the imaging device 1 returns the routine back to Step S1.

In the above-described embodiment, two light-emitting sources which are the LED light emitters 11 and 12 are used.

In this arrangement, control and adjustment of the light-emitting sources are easier than in the case where three light-emitting sources are used, and the color of flash light is controlled so as to be close to the color of ambient light with the use of the two light emitters.

Further, in this embodiment, the color temperature of light emitted from the LED light emitter 11 is different from that from the LED light emitter 12. In addition, the volumes of light from the two light-emitting sources are determined on the basis of the intersection point q3 which is the intersection of the line segment L1' and the line L2. The line L2 is the line passing through the coordinate point representing the light-source color of ambient light and is drawn so as to orthogonally cross the line segment L1' in the chromaticity coordinates. With this, the mixed color of combined light from the two light-emitting sources is controlled within the range defined by the line segment L1'. That is, the above arrangement enables flash light to get close to ambient light at least in terms of color temperature.

Further, in this embodiment, the point ps' is obtained, and the coordinate point t is obtained so as to correspond to the flash light volume ratio R. The point ps' is a point on the line segment and represents one of the 36 mixed colors producible from light emitted from the LED light emitters 11 and 12. The coordinate point t is a point on the line L2' passing through the point ps' and the coordinate point Pe representing the light-source color of ambient light. Then, White Balance adjustment is performed using coefficients obtained with reference to the thus obtained coordinate point t. Thus, White Balance adjustment is performed on the basis of the ratio of the volume of flash light to the volume of ambient light, the balance between which has been adjusted with attention to the main subject area.

As described above, in this embodiment, the color of flash light is controlled so as to be close to the color of ambient light while easiness in control and adjustment of the light-emitting sources is ensured. Further, when the color of flash light is different from the color of ambient light, it is more likely that White Balance adjustment is suitably performed with attention to the main subject area.

Moreover, in this embodiment, the coordinate values of the mixed colors of light emitted from the LED light emitters 11 and 12 are corrected with reference to the measured values of the colors of light from the LED light emitters 11 and 12 which are stored in the characteristic value storage unit 42. While the number of the measured values is two, the number of the coordinate values of the mixed colors is 36. That is to say, all the coordinate values are corrected on the basis of the measured values, the number of which is smaller than the number of the coordinate values. This eliminates the necessity to make measurement on the mixed colors of light emitted from the LED light emitters 11 and 12 at the time of manufacturing the imaging device 1, by changing the light-emission volumes of the light emitters 11 and 12 to cover all the possible combinations of light-emission volumes. This makes the manufacturing process simpler.

The following will describe the reason why the light-source color of the second ambient light is able to be calculated in the light source obtaining unit 102 in the above-described manner. Variables used in the following description are as follows.

AV: aperture value [APEX value]=LOG 2 (FNo^2)
TV: exposure time [APEX value]=LOG 2 (1/time [SEC])
SV: ISO speed [APEX value]=LOG 2 (ISO/3.125)
DV: distance from subject [APEX value]=LOG 2 (distance [m]/1[m])
RV: reflection rate from subject [APEX value] LOG 2 (reflection rate [%]/18[%])
BV: brightness value of ambient light [APEX value]
LV: brightness value of LED light [APEX value]
Ytrg: brightness target value for correct exposure
Ynon: brightness evaluation value in preliminary shooting operation (without preliminary light emission: ambient light)
Ypre: brightness evaluation value in preliminary shooting operation (with preliminary light emission: ambient light+LED light)
AVa: value of AV used in preliminary shooting operation
TVa: value of TV used in preliminary shooting operation
SVa: value of SV used in preliminary shooting operation
LVa: value of LV used in preliminary shooting operation
BVa: brightness value of ambient light in preliminary shooting operation [APEX value]
RVa: reflection rate from subject in preliminary shooting operation [APEX value]=LOG 2 (reflection rate [%]/18[%])
DVa: distance from subject in preliminary shooting operation [APEX value]=LOG 2 (distance [m]/l[m])

There has been known the below-described general expressions for correct exposure. BV (brightness value of ambient light) and LV (brightness value of LED light) are respectively as follows.

$$BV=AV+TV-SV \qquad (a0)$$

$$LV=AV+2*DV+(TV-5)+(5-SV) \qquad (a1)$$

Incorporating the relation with RV (reflection rate of subject) into the equations (a0) and (a1) produces the equations (a2) and (a3).

$$BV+RV=AV+TV-SV \qquad (a2)$$

$$LV+RV=AV+2*DV+(TV-5)+(5-SV) \qquad (a3)$$

Each brightness evaluation value obtained in the preliminary shooting operation is expressed as below, on the basis of the above-described general expressions. Ynon is expressed as follows, using BV (brightness value of ambient light).

$$Ynon=Ytrg*2^{\wedge}((BVa+RVa)-(AVa+TVa-SVa)) \qquad (b0)$$

Ypre (brightness evaluation value in shooting with preliminary light emission in the preliminary shooting operation) is expressed using BV (brightness value of ambient light) and LV (brightness value of LED light). Thus, Ypre is expressed as follows.

$$Ypre=Ytrg*2^{\wedge}((BVa+RVa)-(AVa+TVa-SVa))+Ytrg*2^{\wedge}((LVa+RVa-2*DVa)-(AVa+TVa-SVa)) \qquad (b1)$$

The color evaluation value obtained in the preliminary shooting operation is expressed by incorporating the RGB component ratio into the above expression for brightness. The respective color component ratios of ambient light, LED light, and light reflected off the subject are defined as follows. Note that when two LED light emitters are used to emit light, the below-described LED light is combined light of light emitted from the two light emitters.

RGB component ratio of the color of ambient light: (Penv_r, Penv_g, Penv_b)
RGB component ratio of the color of LED light: (Pled_r, Pled_g, Pled_b)
RGB component ratio of subject's color: (Ptrg_r, Ptrg_g, Ptrg_b)

Now, the color evaluation values Cnon_r, Cnon_g, and Cnon_b in shooting without preliminary light emission are expressed as below, on the basis of (b0) and the RGB component ratios. Note that a variable expressed using an index "i" such as "X_i" means that i designates each of r, g, and b.

$$Cnon\_i = Ptrg\_i * Penv\_i * Ytrg*2\hat{}((BVa+RVa)-(AVa+TVa-SVa)) \quad (d0)$$

The color evaluation values Cpre_r, Cpre_g, and Cpre_b in shooting with preliminary light emission are expressed as below, on the basis of Equation (b1) and the RGB component ratios.

$$Cpre\_i = Ptrg\_i * Penv\_i * Ytrg*2\hat{}((BVa+RVa)-(AVa+TVa-SVa))+Ptrg\_i*Pled\_i*Ytrg*2\hat{}((LVa+RVa-2*DVa)-(AVa+TVa-SVa)) \quad (d1)$$

Further, by subtracting the color evaluation values Cnon_i in shooting without preliminary light emission from the color evaluation values Cpre_i in shooting with preliminary light emission, the components of ambient light are removed from the color evaluation values Cpre_i in shooting with preliminary light emission. Thus, Cdif_i, color evaluation values of light from the LED light sources, are expressed as follows.

$$Cdif\_i = (Cpre\_i - Cnon\_i) = Ptrg\_i * Pled\_i * Ytrg*2\hat{}((LVa+RVa-2*DVa)-(AVa+TVa-SVa)) \quad (d2)$$

The equations for the color evaluation values obtained in the preliminary shooting operation are normalized as below with respect to G, and the obtained result is converted to the expression for the color component ratio. The color component ratio Pnon_r: Pnon_g: Pnon_b, which is the color component ratio of the evaluation values in shooting without preliminary light emission, is expressed as follows, on the basis of Equation (d0). Note that, because the valued are normalized with respect to G, Ptrg_g=Penv_g=Pled_g=1.

$$Pnon\_i = Cnon\_i/Cnon\_g = Ptrg\_i * Penv\_i * A/((Ptrg\_g*Penv\_g)*A) = Ptrg\_i * Penv\_i \quad (e0)$$

$$A = Ytrg*2\hat{}((BVa+RVa)-(Ava+TVa-SVa))$$

The color component ratio Pdif_r:Pdif_g:Pdif_b, which is the color component ratio of the evaluation values of LED light is expressed as follows, on the basis of Equation (d2).

$$Pdif\_i = Cdif\_i/Cdif\_g = Ptrg\_i * Pled\_i * B/((Ptrg\_g*Pled\_g)*B) = Ptrg\_i * Pled\_i \quad (e1)$$

$$B = Ytrg*2\hat{}((LVa+RVa-2*DVa)-(AVa+TVa-SVa))$$

The RGB component ratio of the color of LED light is known. Because of this, the light-source color of ambient light is calculated as below, from the color component ratios Pnon_i and Pled_i, each of which is the color component ratio of the evaluation values. Pnon_i represents the color component ratio of the mixed color of the light-source color and the subject's color. On the basis of Equation (e1), RGB component ratio Ptrg_i, which is the RGB component ratio of the subject's color, is calculated.

$$Ptrg\_i = Pdif\_i/Pled\_i \quad (f0)$$

Because the RGB component ratio Ptrg_i, which is the RGB component ratio of the subject's color, is thus calculated, RGB component ratio Penv_i, which is the RGB component ratio of the color of ambient light is calculated using Equation (e0). According to this method, the light-source color of ambient light is obtained as long as reflected light which is light emitted from the LED light emitters 11 and 12 and reflected off the subject is reflected in images captured in the preliminary shooting operation.

$$Penv\_i = Pnon\_i/Ptrg\_i \quad (f1)$$

MODIFICATION

The following will describe modifications of the above-described embodiment. In the above-described embodiment, one of the light-source colors of the first ambient light and the second ambient light is selected. However, a weighted average value of the light-source colors of the first ambient light and the second ambient light may be used as the light-source color of ambient light. In the weighted average, values may be weighted depending on the size of a white area in the image of the subject, or depending on the ratio of specular reflection light to light reflected off the subject.

In the above-described embodiment, the coordinate values respectively representing the mixed colors producible from light emitted from the LED light emitters 11 and 12 are corrected with reference to the measured values of light emitted from these light emitters. With this, deviation of the setting values due to the individual difference of the LED elements is corrected. Various Modifications are possible related to the above correction. For example, the following modification is possible: LED elements are be classified under a plurality of groups depending on the level of variation in the color of emitted light due to individual difference, and an identification value indicating the group to which each LED element belongs is stored in the imaging device corresponding thereto, instead of the characteristic values. Then, the coordinate values may be corrected on the basis of the identification values and in accordance with the manner of correction depending on the level of variation. Also in this case, the number of the identification values is smaller than the number of the coordinate values, and therefore it is not necessary to measure all the coordinate values at the time of manufacturing the device.

Further, in the above-described embodiment, the light-emission volumes of the LED light emitters 11 and 12 and the like are determined on the basis of the line L2 orthogonal to the line segment L1'. However, the light-emission volumes of the LED light emitters 11 and 12 and the like may be determined on the basis a line crossing the line segment L1' at an angle not 90 degrees. For example, the light-emission volumes of the LED light emitters 11 and 12 and the like may be determined on the basis of a line crossing the line segment L1' at an angle enabling the intersection to represent the color which is the same as the light-source color of ambient light in terms of color temperature. In this case, the color temperature of the intersection point of the crossing line and the line segment L1' is equal to the color temperature of the light-source color of ambient light. Because the mixed color of flash light is determined on the basis of the intersection point, the thus determined mixed color of light emitted from the LED light emitters 11 and 12 is the closest to the light-source color of ambient light in terms of color temperature. The angle of intersection of the line segment L1' and the crossing line may be determined in terms of factors other than color temperature as described above.

What is claimed is:

1. An image capturing method of capturing an image of a subject while emitting light from two light-emitting sources toward the subject, the light-emitting sources being configured so that color temperatures of light emitted from the respective light-emitting sources are different from each other and a ratio between the volumes of light emitted from the light-emitting sources is variably controllable, the method comprising:
- a light-source color obtaining step of obtaining a light-source color of ambient light;
- a preliminary image capturing step including a no-light-emission image capturing step of capturing an image of the subject without light emission from the two light-emitting sources, and a light-emission image capturing step of capturing an image of the subject with light emitted from the two light-emitting sources;
- a light-emitting source light volume obtaining step of obtaining light volume information indicating a relationship between the light volume related to ambient light and the total volume of light from the two light-emitting sources, on the basis of the images of the subject captured in the preliminary image capturing step;
- an image capturing step of capturing an image of the subject while emitting light from the two light-emitting sources toward the subject in such a manner that volumes of light emitted from the two light-emitting sources respectively correspond to those represented by a predetermined point which is (i) an intersection point of a first line and a line segment or (ii) a point close to the intersection point in xy chromaticity coordinates, on the basis of the intersection point and the light volume information obtained in the light-emitting source light volume obtaining step, the first line passing through a first coordinate point in the xy chromaticity coordinates which represents the light-source color obtained in the light-source color obtaining step, the first line being drawn so as to cross the line segment at a predetermined angle, the line segment connecting two coordinate points in the xy chromaticity coordinates which points respectively represent colors of light emitted from the respective two light-emitting sources; and
- a White Balance adjustment step of performing White Balance adjustment on the image captured in the image capturing step on a basis of a White Balance adjustment correction value obtained with reference to a second coordinate point which is on a second line and corresponds to the light volume information obtained in the light-emitting source light volume obtaining step, the second line passing through the predetermined point and the first coordinate point in the xy chromaticity coordinates which represents to the light-source color, wherein
- when: a color component ratio of R, G, and B signals which are obtained from the image captured in the no-light-emission image capturing step and normalized with respect to G signal is defined as $P0\_r, P0\_g, P0\_b$; a color component ratio of a difference between (i) R, G, and B signals obtained from the image captured in the light-emission image capturing step and (ii) R, G, and B signals obtained from the image captured in the no-light-emission image capturing step, values of which differences are normalized with respect to G signal, is defined as $P1\_r, P1\_g, P1\_b$; and a color component ratio of R, G, and B components of a mixed color of combined light emitted from the two light-emitting sources normalized with respect to G component is defined as $P2\_r, P2\_g, P2\_b$, a color component ratio $Pe\_r, Pe\_g, Pe\_b$ of R, G, and B components of the light-source color of ambient light normalized with respect to G component is calculated on the basis of an equation in which: $Pe\_i = P0\_i * P2\_i / P1\_i$, where i designates each of r, q and b: i=r, i=g, and i=b.

2. An image capturing method of capturing an image of a subject while emitting light from two light-emitting sources toward the subject, the light-emitting sources being configured so that color temperatures of light emitted from the respective light-emitting sources are different from each other and a ratio between the volumes of light emitted from the light-emitting sources is variably controllable, the method comprising:
- a light-source color obtaining step of obtaining a light-source color of ambient light;
- a preliminary image capturing step including a no-light-emission image capturing step of capturing an image of the subject without light emission from the two light-emitting sources, and a light-emission image capturing step of capturing an image of the subject with light emitted from the two light-emitting sources;
- a light-emitting source light volume obtaining step of obtaining light volume information indicating a relationship between the light volume related to ambient light and the total volume of light from the two light-emitting sources, on the basis of the images of the subject captured in the preliminary image capturing step;
- an image capturing step of capturing an image of the subject while emitting light from the two light-emitting sources toward the subject in such a manner that the volumes of light emitted from the two light-emitting sources respectively correspond to those represented by a predetermined point which is (i) an intersection point of a first line and a line segment or (ii) a point close to the intersection point in xy chromaticity coordinates, on the basis of the intersection point and the light volume information obtained in the light-emitting source light volume obtaining step, the first line passing through a first coordinate point in the xy chromaticity coordinates which represents the light-source color obtained in the light-source color obtaining step, the first line being drawn so as to orthogonally cross the line segment, the line segment connecting two coordinate points in the xy chromaticity coordinates which points respectively represent colors of light emitted from the respective two light-emitting sources; and
- a White Balance adjustment step of performing White Balance adjustment on the image captured in the image capturing step on a basis of a White Balance adjustment correction value obtained with reference to a second coordinate point which is on a second line and corresponds to the light volume information obtained in the light-emitting source light volume obtaining step, the second line passing through the predetermined point and the first coordinate point in the xy chromaticity coordinates which represents to the light-source color.

3. An image capturing method of capturing an image of a subject while emitting light from two light-emitting sources toward the subject, the light-emitting sources being configured so that color temperatures of light emitted from the respective light-emitting sources are different from each other and a ratio between the volumes of light emitted from the light-emitting sources is variably controllable, the method comprising:
- a correcting step of correcting target values on the basis of at least two measured values related to the two light-emitting sources, the target values representing color information related to mixed color of light from the two light-emitting sources and being different from the measured value, the number of the target values being larger than the number of the measured values;

a light-source color obtaining step of obtaining a light-source color of ambient light;

a preliminary image capturing step including a no-light-emission image capturing step of capturing an image of the subject without light emission from the two light-emitting sources, and a light-emission image capturing step of capturing an image of the subject with light emitted from the two light-emitting sources;

a light-emitting source light volume obtaining step of obtaining light volume information indicating a relationship between the light volume related to ambient light and the total volume of light from the two light-emitting sources, on the basis of the images of the subject captured in the preliminary image capturing step;

an image capturing step of capturing an image of the subject while emitting light from the two light-emitting sources toward the subject in such a manner that the volumes of light emitted from the two light-emitting sources respectively correspond to those represented by a predetermined point which is (i) an intersection point of a first line and a line segment or (ii) a point close to the intersection point in xy chromaticity coordinates, on the basis of (a) the intersection point, (b) the light volume information obtained in the light-emitting source light volume obtaining step, and (c) corrected values of the target values representing color information, which are corrected in the correcting step, the first line passing through a first coordinate point in the xy chromaticity coordinates which represents the light-source color obtained in the light-source color obtaining step, the first line being drawn so as to cross the line segment at a predetermined angle, the line segment connecting two coordinate points in the xy chromaticity coordinates which points respectively represent colors of light emitted from the respective two light-emitting sources; and a White Balance adjustment step of performing White Balance adjustment on the image captured in the image capturing step on a basis of a White Balance adjustment correction value obtained with reference to a second coordinate point which is on a second line and corresponds to the light volume information obtained in the light-emitting source light volume obtaining step, the second line passing through the predetermined point and the first coordinate point in the xy chromaticity coordinates which represents to the light-source color.

4. The image capturing method according to claim 3, wherein the correcting step includes a coordinate value correcting step of correcting coordinate values on the line segment in accordance with the two measured values on the basis of information stored in a storage unit in which the two measured values and the plurality of coordinate values are stored.

5. An image capturing method of capturing an image of a subject while emitting light from two light-emitting diodes toward the subject, the light-emitting diodes being configured so that color temperatures of light emitted from the respective light-emitting diodes are different from each other and a ratio between the volumes of light emitted from the light-emitting diodes is variably controllable, the method comprising:

a light-source color obtaining step of obtaining a light-source color of ambient light;

a preliminary image capturing step including a no-light-emission image capturing step of capturing an image of the subject without light emission from the two light-emitting diodes, and a light-emission image capturing step of capturing an image of the subject with light emitted from the two light-emitting diodes;

a light-emitting source light volume obtaining step of obtaining light volume information indicating a relationship between a light volume related to ambient light and a total volume of light from the two light-emitting diodes, on the basis of the images of the subject captured in the preliminary image capturing step;

an image capturing step of capturing an image of the subject while emitting light from the two light-emitting diodes toward the subject in such a manner that volumes of light emitted from the two light-emitting diodes respectively correspond to those represented by a predetermined point which is (i) an intersection point of a first line and a line segment or (ii) a point close to the intersection point in xy chromaticity coordinates, on the basis of the intersection point and the light volume information obtained in the light-emitting source light volume obtaining step, the first line passing through a first coordinate point in the xy chromaticity coordinates which represents the light-source color obtained in the light-source color obtaining step, the first line being drawn so as to cross the line segment at a predetermined angle, the line segment connecting two coordinate points in the xy chromaticity coordinates which points respectively represent colors of light emitted from the respective two light-emitting diodes; and a White Balance adjustment step of performing White Balance adjustment on the image captured in the image capturing step on a basis of a White Balance adjustment correction value obtained with reference to a second coordinate point which is on a second line and corresponds to the light volume information obtained in the light-emitting source light volume obtaining step, the second line passing through the predetermined point and the first coordinate point in the xy chromaticity coordinates which represents to the light-source color, wherein the light-emitting source light volume obtaining step comprises:

a step of obtaining distance information D (m, n) in image signals obtained from the image captured in the preliminary image capturing step, on the basis of the image signals and in accordance with the below-described Equation 2: $D(m, n) = (LV0 - LOG_2 (Y1(m, n)/Y0(m, n) - 1))/2$, where: (m, n) represents a location in horizontal and vertical directions in the captured image; LV0 represents a total volume of flash light from the two light-emitting diodes in APEX value; Y0 (m,n) represents a brightness value at the location (m, n) obtained from the image captured in the no-light-emission image capturing step; Y1 (m, n) represents a brightness value at the location (m, n) obtained from the image captured in the light-emission image capturing step; and LOG x represents a logarithm to the base x;

a step of obtaining an area corresponding to a main subject from the captured image on the basis of the distance information D (m, n); and a step of obtaining the light volume information with respect to the area corresponding to the main subject.

* * * * *